United States Patent [19]
Rosén

[11] Patent Number: 5,635,011
[45] Date of Patent: Jun. 3, 1997

[54] PACKAGING LAMINATE WITH EXCELLENT SEALING AND BARRIER PROPERTIES AND ALSO PACKAGING CONTAINER MANUFACTURED FROM THE PACKAGING LAMINATE

[75] Inventor: Åke Rosén, Helsingborg, Sweden

[73] Assignee: Tetra Laval Holdings & Finance S.A., Pully, Switzerland

[21] Appl. No.: 328,348

[22] Filed: Oct. 21, 1994

Related U.S. Application Data

[60] Continuation of Ser. No. 42,400, Apr. 2, 1993, which is a division of Ser. No. 875,834, Apr. 28, 1992.

[30] Foreign Application Priority Data

May 3, 1991 [SE] Sweden ................................. 9101331

[51] Int. Cl.$^6$ ..................................... B32B 31/00
[52] U.S. Cl. .................... 156/272.4; 383/11.3; 428/35.4; 428/36.7; 428/402
[58] Field of Search .............. 156/272.2, 272.4; 428/34.7, 35.2, 35.4, 35.7, 36.7, 36.91, 516, 402; 383/109, 110, 113

[56] References Cited

U.S. PATENT DOCUMENTS

| | | | |
|---|---|---|---|
| 4,579,784 | 4/1986 | Lemstra et al. . | |
| 4,867,336 | 9/1989 | Stewart | 156/272.4 X |
| 4,871,613 | 10/1989 | Akao . | |
| 4,906,497 | 3/1990 | Hellmann et al. . | |
| 5,194,306 | 3/1993 | Blatz | 428/35.4 |

FOREIGN PATENT DOCUMENTS

| | | |
|---|---|---|
| 0353991 | 2/1990 | European Pat. Off. . |
| 0353496 | 2/1990 | European Pat. Off. . |
| 1409958 | 10/1975 | United Kingdom . |

*Primary Examiner*—James Engel
*Attorney, Agent, or Firm*—Burns, Doane, Swecker & Mathis, L.L.P.

[57] ABSTRACT

Packaging laminate with excellent sealing and barrier properties comprising a skeletal layer (11) of plastic and filler mixed in the plastic and a barrier layer (12) of plastic of the same type as the plastic in the skeletal layer in a mixture with plastic of another type than the plastic in the skeletal layer, placed against one side of the skeletal layer.

In order to improve the sealing properties of the packaging laminate the barrier layer (12) has been provided with electrically conducting material finely distributed in the barrier layer, preferably soot (carbon black) with the aid of which the packaging laminate can be sealed by means of inductive heating (IH) and dielectric sealing.

8 Claims, 1 Drawing Sheet

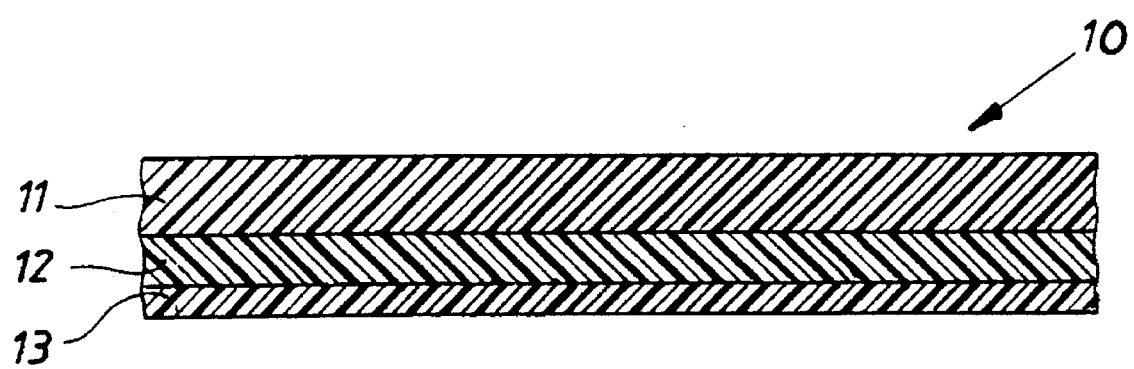

PACKAGING LAMINATE WITH EXCELLENT SEALING AND BARRIER PROPERTIES AND ALSO PACKAGING CONTAINER MANUFACTURED FROM THE PACKAGING LAMINATE

This application is a continuation of application Ser. No. 08/042,400, filed Apr. 2, 1993, which is a divisional of application Ser. No. 07/875,834, filed Apr. 28, 1992.

BACKGROUND OF THE INVENTION

The present invention concerns a flexible packaging laminate in sheet or strip form with excellent sealing and barrier properties, with this packaging laminate having a skeletal layer of plastic and filler mixed in the plastic and also a barrier layer of plastic of the same type as the plastic in the skeletal layer in a mixture with plastic of another type than the plastic in the skeletal layer, placed against one side of the skeletal layer. The invention in addition concerns packaging containers manufactured from the packaging laminate through fold forming, thermo-forming or another mechanical shaping process.

Within packaging technology what are called aseptic packagings are often used for packaging and transporting products of a type sensitive to oxygen and/or light. This may apply to liquid foodstuffs such as juice, wine, edible oil and medical/pharmaceutical/biological preparations which would otherwise easily be damaged or deteriorate already after very short exposure to oxygen and/or light. Aseptic packagings are also used for other products such as milk in order to give the packaged product an extended shelf life so that it can be kept with maintained freshness qualities for very long periods of time without the need for refrigerated storage.

The requirement that is set for aseptic packagings is that they must be oxygen-tight/lightproof and in addition bacteria-tight in order to give the best possible protection to the packaged product. Further requirements for the packaging are that it must be form stable and mechanically strong in order to be able to withstand external stresses to which the packaging is exposed during normal transport and handling. It is naturally an advantage if the packaging is in addition easy to manufacture and after use easy to destroy or to be handled in another manner with fulfilment of current environmental protection requirements.

A large group of known aseptic packagings is manufactured from a laminated material comprising on the one hand a strengthening skeletal layer of paper or cardboard, on the other hand a barrier layer of aluminium (Al foil), which gives the packaging the desired impermeability properties, applied to one side of the skeletal layer, and also further coatings of plastic (usually polythene) to make the material easy to seal through what is known as heat sealing.

From the known packaging material aseptic packagings of disposable character are manufactured, most frequently with the aid of modern rational packaging machines of the type which, either from a strip or from a prefabricated substance of the material, both forms, fills and closes the packagings on a large industrial scale with a high rate of production. Well known examples of aseptic packagings of this type are Tetra Brik (reg. trade mark) and Tetra Rex (reg. trade mark).

A packaging of the type Tetra Brik (reg. trade mark) is manufactured from a strip through the strip first being shaped to a tube through the two longitudinal sides of the strip being joined to each other in a longitudinal overlap joint. The tube is filled with the contents in question and divided into closed cushion-shaped packaging units through repeated transverse sealings of tube zones across the longitudinal direction of the tube below the filling level of the tube. The packaging units are separated from each other through cuts in the transverse sealing zones and given the desired geometric, usually parallepiped shaped final form in a concluding shaping operation during which the double-walled triangular corner flaps of the packagings are folded against and sealed to an adjacent side of the packaging.

The known packaging material has several serious disadvantages which to a great extent and in certain cases can be wholly ascribed to the Al foil used as a barrier layer, which owing to its low elasticity often breaks in particularly stressed areas of the material during manufacture of the packaging and thereby causes deterioration in the hermetic property of the finished packaging. An Al foil is in addition expensive to produce and therefore contributes markedly to giving the packaging high material costs. The known packaging material also has disadvantages owing to the absorbent layer of paper or cardboard which quickly loses its mechanical strength properties and makes the packaging limp and unmanageable when it is exposed to liquids and moisture. The layer of paper or cardboard must therefore be made relatively thick in order to give the packaging the necessary rigidity of form and stability of form, which contributes to increasing the material stress and therewith the risk of formation of cracks in the Al foil during manufacture of the packaging.

Within packaging technology it has therefore always been an objective to find alternative packaging materials which neither use a fibre layer nor Al foil and which therefore are in practice completely freed from drawbacks of the type inherent in the known paper or cardboard based packaging materials.

Such an alternative packaging material which at least partly avoids the problems mentioned here is described for example in EP-A-0 353 991. This known material has a strengthening skeletal layer of plastic and filler mixed in the plastic and has proved to be less costly and less moisture sensitive than the paper or cardboard based material. A similar packaging material is also described in EP-A-0 353 496.

A packaging material consisting only of plastic and filler mixed in the plastic, as described in both these European patent applications, nevertheless lacks the necessary hermetic properties against both oxygen and light and must therefore be supplemented with at least one further layer of a material with the desired hermetic properties in order to be able to be used in aseptic packagings as intended. The only example of such a supplementary layer that is mentioned in both these patent applications is, however, the already discussed expensive Al foil which is prone to cracking.

The Swedish patent no. 468,635 (Swedish patent application no. 9100057-0 which corresponds to U.S. patent application Ser. No. 818,156) describes a packaging material which, like the two last mentioned packaging materials described above, has a strengthening skeletal layer of plastic and filler mixed in the plastic but which, instead of an Al foil, uses an oxygen barrier layer consisting of plastic of the same type as the plastic in the skeletal layer in a mixture with plastic of a different type from the plastic in the skeletal layer. As a particularly preferred type the Swedish patent no. 468,635 (Swedish patent application no. 9100057-0) describes a packaging material in which the plastic in the skeletal layer is to consist of a propylene homopolymer with a melting index of less than 1 according to ASTM (2.16 kg;

230° C.) or an ethylene/propylene copolymer with a melting index between 0.5 and 5 according to ASTM (2.16 kg; 230° C.) and an ethylene/vinyl alcohol copolymer.

This last described packaging material can, however, be further improved and the object of the present invention is therefore to give indications of how such improvements can be effected.

SUMMARY OF THE INVENTION

The aim is achieved according to the invention through the fact that a packaging laminate of the type described in the introduction is given the characteristic that the barrier layer also contains an electrically conductive material in fine particle form.

Through complementing the packaging laminate's barrier layer with fine-particle electrically conductive material the packaging material according to the invention is given excellent sealing properties, which among other things has the effect that it can be sealed with the use of sealing techniques of such as inductive heating (IH) and dielectric sealing. While a heat sealing of the known laminate without fine-particle electrically conductive material sets out to apply the heat necessary for fusion of the laminate's facing layers of plastic from outside the laminate the electrically conductive material in the laminate according to the invention makes it possible to generate by means of inductive or dielectric heating the same amount of heat in situ in the laminate, which has the effect that the seals can be effected much faster than previously.

The choice of fine-particle electrically conductive material is not critical according to the invention, but in principle practically any known electrically conductive material in this field can be used. Particular advantages are gained, however, if the electrically conductive material consists of carbon which also makes the packaging material in practice completely impenetrable to light.

The fine-particle electrically conductive carbon material can consist for example of soot (carbon black) either alone or in combination with other fine-particle carbon, e.g. graphite. Preferably it consists of a mixture of soot (carbon black) and graphite since a barrier layer containing both soot and graphite has proved to be less brittle and more malleable and easier to shape than a barrier layer containing only soot (carbon black) as fine-particle electrically conductive material. If the barrier layer only contains soot (carbon black) the amount of soot (carbon black) should be between 10 and 15, preferably 12% weight, since soot in quantities of over 15% weight makes the barrier layer brittle and difficult to shape, while soot (carbon black) in quantities of under 10% certainly makes the barrier layer malleable and easily shaped but at the cost of a deterioration in electrical conductivity capacity. If on the other hand the barrier layer contains both soot (carbon black) and graphite the amount of soot (carbon black) can be as little as c. 5% without any risk of deterioration in electrical conductivity capacity if the graphite at the same time is c. 15–25, preferably c. 20% weight.

According to a preferred embodiment of the invention the packaging laminate has an external sealing layer of plastic of the same type as the plastic in the skeletal layer, i.e. either a propylene homopolymer with a melting index of under 1 according to ASTM (2.16 kg; 230° C.) or an ethylene/ propylene copolymer with a melting index of between 0.5 and 5 according to ASTM (2.16 kg; 230° C.), applied to the barrier layer.

BRIEF DESCRIPTION OF THE DRAWING

The invention will be described in greater detail below with particular reference to the enclosed drawing which shows schematically a cross section of a packaging material according to the invention.

DESCRIPTION OF THE PREFERRED EMBODIMENTS

The packaging material according to the invention which is shown in the drawing has been given the general reference designation 10. The packaging laminate 10 comprises a strengthening skeletal layer 11 and a barrier layer 12 applied to one side of the skeletal layer (corresponding to the inside of the aseptic packaging produced) giving the packaging laminate excellent sealing properties and hermetic properties against both oxygen and light. The laminate 10 in the preferred embodiment shown has in addition an outer layer 13 applied to the barrier layer 12 and serving on the one hand to protect the barrier layer 12 of the laminate against direct contact with the sterile contents of the aseptic packaging and on the other hand to facilitate heat sealing of the laminate during manufacture of the packaging.

The skeletal layer 11, the barrier layer 12 and the outer sealing layer 13 can be manufactured as separate films, each on its own, which are subsequently joined to each other with the aid of one or more intermediate binding agents to form the finished laminate 10. Preferably, however, the laminate 10 is manufactured by co-extrusion during which the layers are extruded simultaneously by a method which is in itself well known and joined directly to each other through fusion with the use of heat from the extrusion.

The strengthening skeletal layer 11 consists as previously mentioned of plastic and filler mixed in the plastic, with the plastic in the skeletal layer consisting for example of a propylene homopolymer with a melting index of under 1 according to ASTM (2.16 kg; 230° C.) or an ethylene/ propylene copolymer with a melting index of between 0.5 and 5 according to ASTM (2.16 kg; 230° C.). The amount of filler in the skeletal layer can vary within wide limits and is in general situated between 50 and 80%, reckoned by the weight of the skeletal layer. The preferred amount of filler is c. 65%. The type of filler can also vary and in itself does not constitute a critical part of the invention. In practice any known filler in that field can be used according to the invention, even if chalk, clay (china clay), talc and mica each on its own or in any desired mutual combination with each other form examples of particularly preferred fillers. The most preferred filler is, however, chalk.

The barrier layer 12 consists as previously mentioned of a mixture of plastic and fine-particle electrically conductive material mixed in the plastic. The mixture of plastic consists partly of a plastic of the same type and partly a plastic of a different type from the plastic in the skeletal layer 11. The plastic of the same type as the plastic in the skeletal layer can thus be a propylene homopolymer with a melting index of under 1 according to ASTM (2.16 kg; 230° ) or an ethylene/ propylene copolymer with a melting index of between 0.5 and 5 according to ASTM (2.16 kg; 230° ). The plastic of a different type from the plastic in the skeletal layer 11 must be a plastic with good oxygen-tight properties. Examples of plastic of this type are an ethylene/vinyl alcohol copolymer (EVOH), polyvinylidine chloride and polyamide, among which the ethylene/vinyl alcohol copolymer (EVOH) is the most preferred. The fine-particle electrically conductive material in the skeletal layer is preferably a carbon material such as soot (carbon black) either alone or in combination with graphite.

The amount of plastic of the same type as the plastic in the skeletal layer 11, e.g. ethylene/propylene copolymer with a melting index of between 0.5 and 5 according to ASTM (2.16; 230° C.), can vary between 20 and 60% weight, while the amount of plastic of a different type from the plastic in the skeletal layer 11, e.g. ethylene/vinyl alcohol copolymer (EVOH), can vary between 40 and 80% weight. The amount of fine-particle electrically conductive material which must be used in the barrier layer 12 can vary depending on the special choice of fine-particle material. If the electrically conductive material for example consists of soot (carbon black) the amount must be between 10 and 15, preferably 12% weight, while if the electrically conductive material consists of a mixture of soot (carbon black) and graphite the relative proportions of these two carbon materials must be between 5 and 10, preferably c. 6% weight and between 15 and 25, preferably c. 20% weight graphite respectively.

The outer sealing layer 13 consists according to the invention of a plastic of the same type as the plastic in the skeletal layer 11 and can thus for example be a propylene homopolymer with a melting index of under 1 according to ASTM (2.16 kg; 230° C.) or an ethylene/propylene copolymer with a melting index of between 0.5 and 5 according to ASTM (2.16 kg; 230° C.).

A particularly preferred embodiment of the invention thus has the following composition of the layers of material in the packaging laminate 10: the skeletal layer 11 consists of c. 35% weight of an ethylene/propylene copolymer with a melting index of between 0.5 and 5 according to ASTM (2.16 kg; 230° C.) and c.65% weight filler (preferably chalk); the barrier layer consists of a mixture of 34% weight ethylene/propylene copolymer with a melting index of between 0.5 and 5 according to ASTM (2.16 kg; 230° C), 40% weight ethylene/vinyl alcohol copolymer (EVOH), c. 6% weight soot (carbon black) and c. 20% weight graphite; and the outer sealing layer 13 consists of an ethylene/propylene copolymer with a melting index of between 0.5 and 5 according to ASTM (2.16 kg; 230° C.).

From a packaging laminate 10 what is known as aseptic packagings are manufactured with excellent sealing and barrier properties (oxygen-tightness, light-proof property etc.) either through fold forming, thermo-forming or other mechanical form processing of the laminate. For example from a strip of the packaging laminate packagings are manufactured, as previously described, through the strip first being shaped to a tube through the two longitudinal edges of the strip being joined to each other in a longitudinal sealing joint. The tube is filled with the contents in question and divided into closed cushion shaped packaging units through repeated transverse sealings of the tube below the level of contents of the tube. The packaging units are separated from each other through cuts in the transverse seals and are then given the desired geometric final form, e.g. that of a parallellepiped, through a final shaping operation during which the double-wall triangular corner flaps of the packagings are folded against and sealed to an adjacent side of the packaging.

A packaging laminate according to the present invention thus solves in a simple and effective manner the previously described problems which are connected with known paper or cardboard based packaging laminates, at the same time as it offers valuable advantages in comparison with known non-fibre based packaging materials of the type described in for example the two European patent applications mentioned or the Swedish patent no. 468,635 (Swedish patent application no. 9100057-0). In its most preferred embodiment the packaging material is in addition a valuable material from the environmental standpoint since all layers forming part of the laminate consist wholly or mainly of one and the same plastic which is easy to recover with already existing recovery technology.

I claim:

1. The process for the manufacture of an aseptic packaging container comprising:

making a flexible packaging laminate having a skeletal layer with an inner side and an outer side and a barrier layer on the inner side of the skeletal layer, said skeletal layer comprising a mixture of plastic and filler wherein the amount of filler in the skeletal layer is in the range of 50 to 80% by weight of the skeletal layer, and said barrier layer comprising a mixture of plastic of the same type as the plastic in the skeletal layer, plastic of a different type from the plastic in the skeletal layer with said different type of plastic providing oxygen impermeability to the barrier layer, and an electrically conductive material in a fine particle form which allows the laminate to be heat sealable by inductive heating or dielectric sealing, and mechanically forming and heat sealing by inductive heating or dielectric sealing the flexible packaging laminate into a container.

2. The process of claim 1, wherein the flexible packaging laminate includes an inner layer adjacent to the barrier layer such that the barrier layer is between the skeletal layer and the inner layer, said inner layer comprising plastic of the same type used in the skeletal layer.

3. The process of claim 2, wherein the mechanically forming step includes fold forming or thermo-forming.

4. The process of claim 1, wherein the electrically conductive material is homogeneously distributed throughout the barrier layer.

5. The process of claim 1, wherein the electrically conductive material consists of carbon black.

6. The process of claim 1, wherein the electrically conductive material consists of a mixture of carbon black and graphite.

7. The process of claim 1, wherein the filler is chalk, clay, talc, mica or a combination thereof.

8. The process of claim 1, wherein the different type of plastic providing oxygen impermeability to the barrier layer is selected from the group consisting of ethylene/vinylalcohol copolymer, polyvinylidine chloride and polyamide.

* * * * *